June 26, 1934.  W. FERRIS  1,964,398
CHOKED OUTFLOW HYDRAULIC TRANSMISSION
Filed March 31, 1932   2 Sheets-Sheet 1

INVENTOR.
WALTER FERRIS.
BY
ATTORNEY.

June 26, 1934.   W. FERRIS   1,964,398
CHOKED OUTFLOW HYDRAULIC TRANSMISSION
Filed March 31, 1932   2 Sheets-Sheet 2

INVENTOR.
WALTER FERRIS.
BY *Wesley Merrill*
ATTORNEY.

Patented June 26, 1934

1,964,398

UNITED STATES PATENT OFFICE

1,964,398

CHOKED OUTFLOW HYDRAULIC TRANSMISSION

Walter Ferris, Milwaukee, Wis., assignor to The Oilgear Company, Milwaukee, Wis., a corporation of Wisconsin Application March 31, 1932, Serial No. 602,223

8 Claims. (Cl. 60—52)

This invention relates to hydraulic transmissions of the type in which a hydraulic motor is driven by liquid supplied from a constant pressure source and the outflow from the motor is restricted to regulate the motor speed.

Hydraulic motors are often employed to perform work which requires that the motor should operate at an accurately regulated speed and to maintain that speed constant, such as operating the tool or work carriages of machine tools.

A motor employed to perform work of this character is ordinarily operated at predetermined speeds by motive liquid supplied thereto at closely regulated volumetric rates from a variable delivery pump, but it is also common practice to control the speed of the motor by regulating its outflow or the rate at which liquid is discharged therefrom and to operate the motor by supplying motive liquid thereto from a constant pressure source, such as a constant pressure pump, an accumulator, or a constant delivery pump having a relief valve connected thereto through which is exhausted liquid delivered by the pump in excess of requirements and which determines the pressure of the liquid delivered to the motor.

The pump or other constant pressure source delivers liquid to the motor at a constant pressure, which is higher than the highest pressure required by the motor to perform its work, and tends to deliver liquid to the motor at a rate greater than the rate required to operate the motor at the highest desired speed.

The liquid exhausted from the motor is forced through a restricted passageway which limits the rate at which the liquid may be exhausted and thereby causes the exhaust liquid to have a pressure which is equal to the difference between the constant pressure of the motive liquid and the pressure required by the motor to perform its work.

The rate at which liquid will flow through a restricted passageway depends upon both the pressure and the viscosity of the liquid.

The pressure of the exhaust liquid varies inversely to the load carried by the motor. That is, if the motor load increases, a larger amount of the energy transmitted to the motor by the motive liquid will be expended in operating the motor and a smaller amount of this energy will be expended in creating pressure in the exhaust liquid and, consequently, will create a lower pressure therein. Conversely, if the motor load decreases, a higher pressure will be created in the exhaust liquid.

Therefore, if the effective cross-sectional area of the restricted passageway remained constant, the motor would slow down when its load increased and speed up when its load decreased.

The liquid employed is ordinarily a good grade of lubricating oil the viscosity of which varies in accordance with variations in the temperature thereof. That is, it is thinner when hot than when cold and its rate of flow through a restricted passageway at any given pressure will increase in response to an increase in temperature and decrease in response to a decrease in temperature.

Therefore, if the effective cross-sectional area of the restricted passageway remained constant, the motor would operate at a greater speed when the exhaust liquid was hot than when it was cold.

Consequently, in order to maintain the speed of the motor constant throughout the entire range of operating temperatures and pressures, it is necessary to regulate the outflow by mechanism which is responsive to variations in both temperature and pressure.

Further, the adjustments made by this mechanism in response to a variation in temperature and a variation in pressure should be interdependent in order to obtain an accurate and uniform motor speed.

An object of the invention is to provide a hydraulic transmission with a flow regulator which will maintain the flow of liquid from the motor at a uniform and constant rate throughout a given range of variations in the temperature and the pressure of the liquid.

Another object is to provide a hydraulic transmission with a flow regulator which is responsive to variations in temperature and pressure to maintain constant the rate of flow of liquid from the motor and which is adjustable to vary that rate.

According to the invention in a general aspect, a flow regulator is connected to the discharge outlet of the motor of a hydraulic transmission and provided with a restricted passageway through which the discharge liquid flows and which has its effective cross-sectional area varied in response to variations in both the temperature and the pressure of the liquid to maintain the flow therethrough at a constant rate.

The invention is exemplified by the apparatus illustrated in the accompanying drawings in which the views are as follows:

Figs. 5 and 6 are longitudinal sections through a control valve and show the plunger thereof in different operative positions from that shown in Fig. 1.

Figure 1:
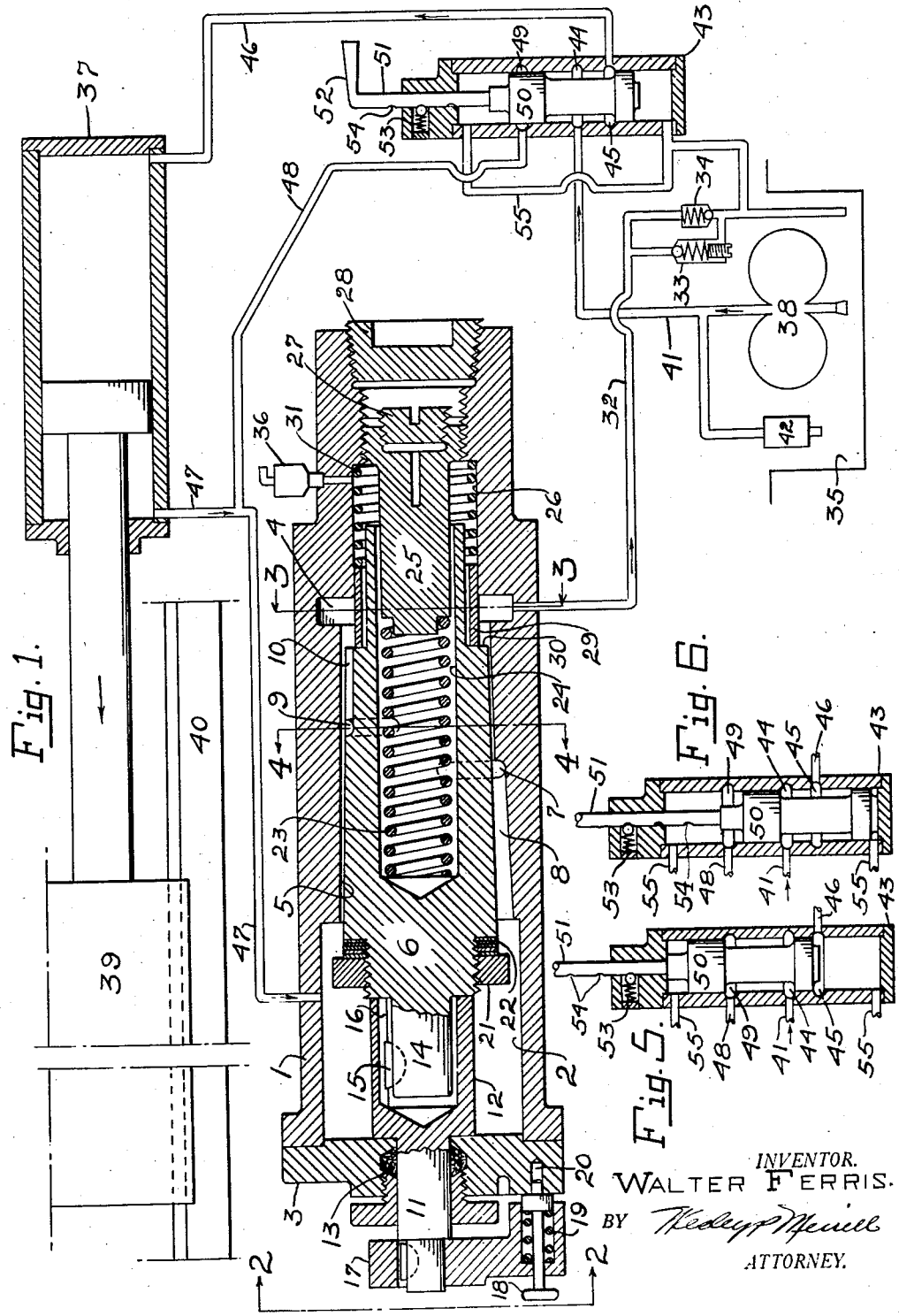
Fig. 1 is a schematic drawing showing a flow regulator connected in series with the motor of a hydraulic transmission for regulating the rate at which liquid may be discharged from the motor to thereby regulate the motor speed.
Figure 2:
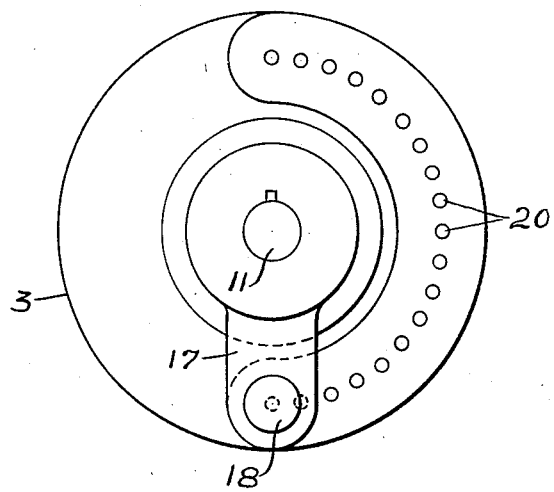
Fig. 2 is an end view of the flow regulator taken on the line 2—2 of Fig. 1.
Figure 3:
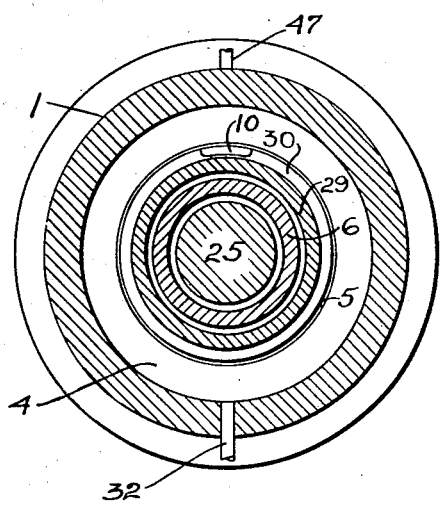
Fig. 3 is a transverse section through the regulator taken on the line 3—3 of Fig. 1.

The flow regulator has its mechanism arranged within and carried by a tubular casing 1 having an inlet chamber 2 formed in its front end and closed by a head 3, an outlet port 4 arranged intermediate the ends and spaced from the inlet chamber, and a tapered bore 5 connecting the inlet chamber to the outlet port. The bore 5 is larger at its front end than at its rear end and ordinarily as a taper of approximately .06 inches per foot.

The flow of liquid through the regulator is controlled by a valve 6 which has the same taper as the bore 5 and is arranged therein to provide a restricted passageway between its periphery and the wall of the bore.

The bore 5 has a transverse peripheral groove 7 formed in its wall and communicating with the inlet chamber through a longitudinal groove 8 which is also formed in the wall of the bore, and the valve 6 has a transverse peripheral groove 9 formed therein and communicating with the outlet port through a longitudinal groove 10 which is also formed in the outer surface of the valve.

The transverse grooves 7 and 9 extend around the valve through a predetermined angular distance, for instance through an angle of 160°, and are normally spaced from each other both axially and circumferentially so that the length of the restricted passageway through which liquid must flow depends upon the relative positions of the grooves 7 and 9.

The rate at which liquid will flow through a restricted passageway depends upon the length and the effective cross-sectional area of the passageway and upon the pressure and the fluidity of the liquid. In this case, the liquid flowing from groove 7 to groove 9 does not follow a positively defined path but consists of a thin sheet of liquid flowing from groove 7 through the path of least resistance to the nearest portion of groove 9. The lengths of the paths of various particles of the liquid will be different as the greater part of the liquid will pass between the nearest points of the two grooves and smaller volumes will pass between more distant points of the grooves.

The length of the passageway is initially adjusted by rotating the valve 6. When the grooves 7 and 9 are opposed to each other as shown in Figs. 1 and 4, the passageway will have its greatest available length and will impose the greatest resistance to the flow of liquid therethrough.

Figure 4:
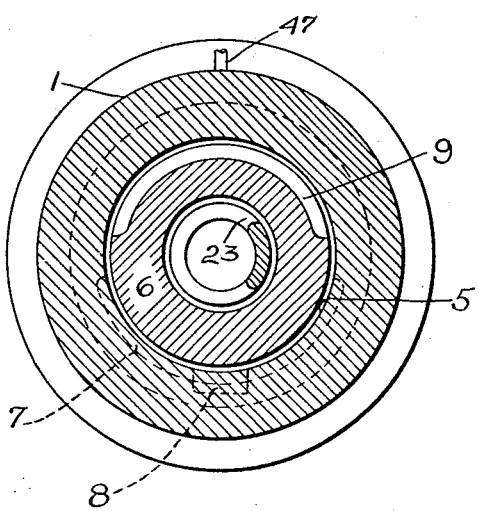
Fig. 4 is a transverse section through the regulator taken on the line 4—4 of Fig. 1.

When valve 6 is rotated from the position shown in Fig. 4, longer arcs of the two grooves come opposite each other and offer a wider and shorter passageway parallel to the axis of the valve 6. This will cause increased flow, both by increasing the average width of the passageway and by reducing its average length.

When the valve is rotated until the grooves 7 and 9 are in axial alinement throughout the entire lengths thereof, the restricted passageway will be reduced to its shortest length and will impose the least resistance to the flow of liquid therethrough.

The valve 6 is rotated by the shaft 11 which is provided upon its rear or inner end with a socket 12 and has its other end extended through the head 3 and through a gland or packing box 13 carried thereby.

The valve 6 is provided upon its front end with a stem 14 which is arranged within the socket 12 and splined thereto by a key 15 which is fixed in the stem and fitted in an elongated keyway 16 formed in the socket.

The socket and the elongated keyway allow the valve 6 to reciprocate in the bore 5 to vary the effective cross-sectional area of the restricted passageway between itself and the wall of the bore.

The outer or front end of the shaft 11 has a handle 17 attached thereto and provided at its free end with a plunger 18 which is urged rearward by a spring 19 and holds the valve in adjusted positions by engaging any one of a series of holes 20 formed in the head 3.

Liquid entering the inlet chamber 2 acts upon the valve 6 and tends to move it rearward to reduce the clearance between it and the wall of the bore 5 to thereby further restrict the flow of liquid through the regulator in response to an increase in the pressure of the liquid.

In order to prevent the liquid from moving the valve 6 so far rearward that the passageway through the regulator would be entirely closed, the front end of the valve 6 is reduced in diameter and has a stop collar 21 threaded thereon to engage the rear wall of the inlet chamber 2 and limit the rearward movement of the valve 6.

The stop collar 21 is arranged in adjusted position upon the valve 6 by inserting shims 22 between it and the shoulder formed at the junction of the body of the valve 6 with the reduced part upon which the stop collar 21 is threaded.

The rearward movement of the valve 6 is resisted by a helical compression spring 23 which is arranged within an axial recess 24 formed in the valve 6 and extending forward from the rear end thereof.

The spring 23 is arranged between the front end of the recess 24 and the front end of an adjusting screw 25 which is threaded at its rear or head end into the rear end of the casing 1 and extends forward into the recess 24 through a cylindrical bore 26 which is formed in the casing 1 at the rear of the port 4 and forms substantially a continuation of the bore 5.

The tension of the spring 23 may be adjusted by rotating the screw 25 which has its rear or head end split and provided with a tapered expansion plug 27 to expand it and clamp the screw in adjusted position within the casing 1.

The rear end of the bore 26 is closed by the rear or head end of the screw 25 and additional closure thereof may be provided by a tapered plug 28 threaded into the rear end of the casing 1.

The bore 26 is separated from the port 4 by a sealing ring 29 which is loosely fitted in the front end of the bore 26 and extends over the port 4 into engagement with a shoulder 30 formed upon the valve 6. The rear part of the value 6 is reduced in diameter and extends through the sealing ring and into the bore 26.

The front edge of the sealing ring is maintained in continual engagement with the shoulder 30 by a helical compression spring 31 which is arranged within the bore 26 between the rear end thereof and the rear edge of the sealing ring.

Liquid passed through the flow regulator is ordinarily discharged from the outlet port 4 through a drain pipe 32 which has a low pressure resistance valve 33 and a check valve 34 connected in parallel therein intermediate the ends thereof and it has its discharge end arranged below the level of the liquid in a reservoir 35.

The check valve 34 allows liquid to be drawn freely from the reservoir 35 into the flow regulator but prevents the discharge of liquid from the flow regulator except through the resistance valve 33 which resists the flow of liquid therethrough and thereby causes a low pressure to be created in the outlet port.

When the pressure of the liquid entering the inlet chamber increases, the valve 6 is moved rearward and the springs 23 and 31 are compressed and, when the pressure of this liquid decreases, the spring 23 moves the valve 6 forward and the spring 31 moves the sealing ring 29 forward at the same rate and continues to hold it in engagement with the shoulder 30.

The valve 6 is thus frequently or continually reciprocated in response to variations in pressure, and any foreign matter carried by the liquid is rolled and agitated and thereby caused to pass through the restricted passageway and prevented from clogging the regulator.

The taper of the bore 5 and the valve 6 is such that the valve 6 has a substantial axial movement in response to a normal variation in pressure, thereby facilitating the passage through the regulator or foreign matter carried by the liquid.

The sealing ring 29 prevents free flow of liquid between the outlet port and the bore 26 but it has sufficient clearance to allow liquid to seep past it and keep the bore 26 completely filled; thus causing the bore 26 to function as a dashpot to dampen any sudden axial movements of the valve 6.

When the valve 6 moves rearward, liquid is expelled from the bore 26 through the resistance valve 33 and, when the valve 6 moves forward, liquid is drawn into the bore 26 from the reservoir 35 through the check valve 34.

In order to allow the escape of entrained air or gas from the bore 26, it ordinarily has connected thereto an air drain valve 36 such as the valve disclosed in Patent No. 1,700,394 issued January 29, 1929 to L. F. Young.

If the pressure in the inlet chamber drops below a predetermined minimum, the spring 23 moves the valve 6 forward until it abuts the end of the socket 12 at which time the effective cross-sectional area of the restricted passageway between the transverse grooves 7 and 9 is the greatest and of sufficient area to allow a predetermined volumetric flow of liquid therethrough at a minimum pressure.

When the pressure increases, the liquid moves the valve 6 rearward and reduces the cross-sectional area of the restricted passageway in accordance with the value of the pressure increase, thereby maintaining the flow of liquid through the regulator at a constant predetermined rate at any given temperature.

In order to compensate for variations in the fluidity of the liquid due to variations in the temperature thereof, the valve 6 is made of a material having a higher coefficient of expansion than the material of which the casing is made, the materals being selected in accordance with the characteristics of the liquid to be employed. For instance, the casing may be made of invar and the valve of brass if lubricating oil is employed.

An increase in the temperature of the liquid will increase the fluidity thereof and heat will be transferred from the liquid to the valve and cause it to expand relatively to the casing, thus decreasing the effective cross-sectional area of the restricted passageway as the fluidity of the liquid increases and thereby maintain the flow of liquid through the regulator constant at any given pressure.

As the valve 6 is subjected at all times to both the temperature and the pressure of the liquid and is adjustable in response to a variation in either the temperature or the pressure to vary the effective cross-sectional area of the restricted passageway between itself and the wall of the bore 5, the effect upon the passageway by an adjustment of the valve in response to a variation in one of these factors is always dependent upon the existing adjustment of the valve due to the other factor at the instant that the variation occurs.

For example, if the prevailing temperature and pressure of the liquid were such that the clearance between the valve 6 and the bore 5 is .002 inches and then the temperature increased N degrees and expanded the valve to decrease this clearance by .0001 inches, the reduction in clearance would be 5% while, if the prevailing pressure and temperature were such that this clearance was .001 inches, an increase of N degrees in temperature would cause a reduction in clearance of 10 per cent.

The regulator is thus automatically adjusted in response to variations in both the temperature and the pressure of the liquid, and the adjustment produced by one factor is always dependent upon the adjustment produced by the other factor.

While the flow regulator may be employed to regulate the flow of liquid from various sources, it is shown diagrammatically in Fig. 1 as being employed to regulate the discharge of liquid from a reciprocating hydraulic motor 37 which is supplied with motive liquid from a gear pump 38 and employed to reciprocate the carriage 39 of a machine tool upon its ways 40.

The pump draws liquid from the reservoir 35 and delivers it into a supply pipe 41 at a volumetric rate greater than that required by the motor when it is operating at its greatest speed.

The liquid delivered by the pump in excess of the motor requirements is exhausted through a relief valve 42 which is connected to the pipe 41 and set to open at a predetermined pressure to thereby cause the pump to deliver liquid to the motor at a predetermined constant pressure.

The delivery of liquid to the motor is controlled by a control valve 43 having an inlet port 44 formed therein to which the supply pipe 41 is connected and an exit port 45 arranged at one side of the port 44 and connected by a pipe 46 to the head end of the motor 37.

The rod end of the motor 37 is connected to the inlet chamber 2 of the flow regulator by a pipe 47 which is connected intermediate its ends by a pipe 48 to a port 49 formed in the control valve 43 upon the other side of the inlet port 44.

The flow of liquid through the valve 43 is controlled by its plunger 50 the stem 51 of which extends through the head of the valve casing and is provided upon its outer end with an operating handle 52.

The plunger 50 is retained in any one of three selected positions by a spring detent 53 which is arranged in the head of the valve casing and engages any one of three depressions 54 formed in the stem 51.

In order to allow the plunger 50 to be moved easily and to allow the escape of any liquid which might seep past it, the ends of the valve casing are connected to each other and to the drain pipe 32 by a pipe 55.

When the plunger 50 is in the position shown in Fig. 1, the port 45 is open to the port 44 and liquid will flow from the pump 38 through the pipe 41, the valve 43 and the pipe 46 to the head end of the motor 37 and tend to advance the carriage 39 at high speed but, as the port 49 is closed at this time, the liquid exhausted from the motor must be expelled through the flow regulator which limits the rate at which liquid may be exhausted from the motor and thereby limits the motor speed and the speed of the carriage 39.

As the pump is delivering a greater volume of liquid than can be utilized by the motor, the relief valve 42 is open to permit the escape of excess liquid and the pump is delivering motive liquid to the motor at a constant pressure determined by the adjustment of the relief valve 42.

The force exerted upon the piston of the motor is expended in advancing the carriage and in forcing liquid from the rod end of the motor through the flow regulator.

The resistance offered by the flow regulator to the flow of liquid therethrough causes a back pressure to be created in the exhaust liquid equal to the difference between the constant pressure of the motive liquid and the pressure required by the motor to move the carriage.

The pressure created in the exhaust liquid would tend to increase the rate of flow through the regulator but the exhaust liquid acts upon the valve 6 and urges it rearward to reduce the cross-sectional area of the restricted passageway between the valve 6 and the casing 1 in accordance with the increase in pressure and thereby maintain the rate of discharge and the motor speed constant.

If the motor load should increase, as by a tool taking a heavier cut from the work carried by the carriage, a greater amount of the force exerted upon the motor piston by the motive liquid is expended in moving the carriage and a correspondingly smaller force is available to expel liquid through the flow regulator.

Consequently, the pressure of the exhaust liquid drops until it is equal to the difference between the constant pressure of the motive liquid and the pressure required to advance the carriage.

Decreasing the pressure of the exhaust liquid would cause it to flow through the flow regulator at a slower rate if the cross-sectional area of the restricted passageway remained unchanged, but the decrease in pressure allows the spring 23 to move the valve 6 forward until the cross-sectional area of the restricted passageway has been increased sufficiently to maintain the rate of discharge and the motor speed constant at the new or decreased pressure.

Conversely, if the motor load decreases, the pressure of the exhaust liquid increases and the valve 6 is forced rearward by liquid pressure to decrease the cross-sectional area of the restricted passageway and thereby maintain the rate of discharge and the motor speed constant at the new or increased pressure.

The flow regulator thus maintains the rate of flow therethrough and the motor speed constant at any given temperature throughout the entire range of ordinary operating pressure.

If the temperature of the liquid should increase and thereby cause an increase in the fluidity of the liquid, the valve 6 will expand and decrease the cross-sectional area of the restricted passageway in accordance with the increase in the temperature and thereby maintain the rate of flow therethrough constant at any given pressure.

Conversely, if the temperature of the liquid should decrease and thereby cause a decrease in the fluidity of the liquid, the valve 6 will contract and increase the cross-sectional area of the restricted passageway in accordance with the decrease in the temperature and fluidity of the liquid.

The valve 6 thus responds to variations in both the temperature and pressure of the exhaust liquid and varies the cross-sectional area of the restricted passageway in response to a variation in either the temperature or the pressure of the liquid or it may respond to simultaneous changes in both the temperature and pressure, thereby maintaining the rate of flow of liquid therethrough and the speed of the motor constant throughout the entire range of operating temperatures and pressures.

When the plunger 50 of the control valve 43 is moved to the position shown in Fig. 5, the port 49 is open to the port 44 and the port 45 is open to the drain pipe 55. The full volume of the liquid delivered by the pump will then flow through the pipe 41, the valve 43 and the pipe 48 to the rod end of the motor 37 and retract its piston at high speed, and the liquid expelled from the head end of the motor by the piston will flow through the pipe 46, the valve 43 and the drain pipes 55 and 32 to the reservoir 35.

When the plunger 50 is moved to the position shown in Fig. 6, the port 45 is open to the port 44 and the port 49 is open to the drain pipe 55. The full volume of the liquid delivered by the pump will now flow through the pipe 41, the valve 43 and the pipe 46 to the head end of the motor 37 and advance its piston at high speed, and the liquid expelled from the rod end of the motor by the piston will flow through the pipes 47 and 48, the valve 43 and the drain pipes 55 and 32 to the reservoir 35.

The invention herein set forth is susceptible of various modifications and adaptations without departing from the scope thereof as hereafter claimed.

The invention is hereby claimed as follows:

1. The combination, with a hydraulic motor which is operated by motive liquid supplied thereto in adequate volume and at a constant pressure and which carries varying loads requiring it to consume varying amounts of the energy supplied to it by said motive liquid, of mechanism connected to said motor for restricting the discharge of liquid therefrom and for regulating the rate of said discharge to thereby control the speed of said motor and to cause a pressure to be created in said exhaust liquid, said mechanism having included therein an expansible element which forms in part a restricted passageway for the discharge of said exhaust liquid and which is responsive to temperature variations to vary the effective cross-sectional area of said passageway in response to variations in the temperature of said exhaust liquid and which is acted upon by said exhaust liquid and varies the effective cross-sectional area of said passageway in response to variations in the pressure of said exhaust liquid to thereby maintain said discharge rate constant throughout the entire range of operating temperatures and pressures of said exhaust liquid and thereby maintain the speed of said motor constant under all conditions of normal operation, and means for adjusting said element to vary the effective length of said passageway.

2. The combination, with a hydraulic motor which is operated by motive liquid supplied thereto in adequate volume and at a constant pressure and which carries varying loads requiring it to consume varying amounts of the energy supplied to it by said motive liquid, of mechanism connected to said motor for restricting the discharge of liquid therefrom and for regulating the rate of said discharge to thereby control the speed of said motor and to cause a pressure to be created in said exhaust liquid, said mechanism having included therein an expansible element which forms in part a restricted passageway for the discharge of said exhaust liquid and which is responsive to temperature variations to vary the effective cross-sectional area of said passageway in response to variations in the temperature of said exhaust liquid and which is acted upon by said exhaust liquid and varies the effective cross-sectional area of said passageway in response to variations in the pressure of said exhaust liquid to thereby maintain said discharge rate constant throughout the entire range of operating temperatures and pressures of said exhaust liquid and thereby maintain the speed of said motor constant under all conditions of normal operation, and means for adjusting said mechanism to regulate the speed of said motor at any given temperature and pressure of said exhaust liquid including manually operable means for adjusting said element to vary the effective length of said passageway.

3. The combination, with a hydraulic motor which is operated by motive liquid supplied thereto in adequate volume and at a constant pressure and which carries varying loads requiring it to consume varying amounts of the energy supplied to it by said motive liquid, of mechanism connected to said motor and providing a restricted passageway through which liquid exhausted from said motor must pass and which regulates the rate at which said exhaust liquid is discharged from said motor and thereby controls the speed of said motor and causes a pressure to be created in said exhaust liquid, said mechanism having included therein means automatically adjustable in response to variations in both the temperature and the pressure of said exhaust liquid to decrease the cross-sectional area of said passageway in response to an increase in either or both the temperature and pressure of said exhaust liquid and to increase the cross-sectional area of said passageway in response to a decrease in either or both the temperature and pressure of said exhaust liquid to thereby maintain said discharge rate constant throughout the entire range of operating temperatures and pressures of said exhaust liquid and thereby maintain the speed of said motor constant under all conditions of normal operation, and means for initially adjusting the effective length of said passageway.

4. The combination, with a hydraulic motor which is operated by motive liquid supplied thereto in adequate volume and at a constant pressure and which carries varying loads requiring it to consume varying amounts of the energy supplied to it by said motive liquid, of mechanism connected to said motor and providing a restricted passageway through which liquid exhausted from said motor must pass and which regulates the rate at which said exhaust liquid is discharged from said motor and thereby controls the speed of said motor and causes a pressure to be created in said exhaust liquid, said mechanism having included therein means automatically adjustable in response to variations in both the temperature and the pressure of said exhaust liquid to decrease the cross-sectional area of said passageway in response to an increase in either or both the temperature and pressure of said exhaust liquid and to increase the cross-sectional area of said passageway in response to a decrease in either or both the temperature and pressure of said exhaust liquid to thereby maintain said discharge rate constant throughout the entire range of operating temperatures and pressures of said exhaust liquid and thereby maintain the speed of said motor constant under all conditions of normal operation, means for adjusting the initial cross-sectional area of said passageway, and means for initially adjusting the effective length of said passageway.

5. The combination, with a hydraulic motor which is operated by motive liquid supplied thereto in adequate volume and at a constant pressure and which carries varying loads requiring it to consume varying amounts of the energy supplied to it by said motive liquid, of means for maintaining the speed of said motor constant under all conditions of normal operation, comprising a valve casing having an inlet connected to said motor to receive the liquid discharged therefrom and an outlet for exhausting said liquid, a valve arranged in said casing and forming therewith a restricted passageway between said inlet and said outlet, and means for exerting a substantially constant pressure upon said valve to urge it toward said inlet to thereby increase the cross-sectional area of said passageway, said valve being urged toward said outlet by said discharge liquid and subjected at all times to the pressure and the temperature of said discharge liquid and having a higher coefficient of expansion than said casing whereby a variation in either the pressure or the temperature of said discharge liquid will cause a variation in the cross-sectional area of said passageway.

6. The combination, with a hydraulic motor which is operated by motive liquid supplied thereto in adequate volume and at a constant pressure and which carries varying loads requiring it to consume varying amounts of the energy supplied to it by said motive liquid, of means for maintaining the speed of said motor constant under all conditions of normal operation, comprising a valve casing having a tapered bore and an inlet arranged at one end of said bore and connected to said motor to receive the liquid discharged therefrom and an outlet arranged at the other end of said bore for exhausting said liquid, a valve arranged in said bore and forming therewith a restricted passageway between said inlet and said outlet, and a spring for urging said valve toward said inlet to thereby increase the cross-sectional area of said passageway, said valve being urged toward said outlet by said discharge liquid and subjected at all times to the pressure and the temperature of said discharge liquid and having a higher coefficient of expansion than said casing whereby a variation in either the pressure of the temperature 7. The combination, with a hydraulic motor which is operated by motive liquid supplied thereto in adequate volume and at a constant pressure and which carries varying loads requiring it to consume varying amounts of the energy supplied to it by said motive liquid, of means for maintaining the speed of said motor constant under all conditions of normal operation, comprising a valve casing having an inlet connected to said motor to receive the liquid discharge therefrom and an outlet for exhausting said liquid, a valve arranged in said casing and forming therewith a restricted passageway between said inlet and said outlet, means for exerting a substantially constant pressure upon said valve to urge it toward said inlet to thereby increase the cross-sectional area of said passageway, said valve being urged toward said outlet by said discharge liquid and subjected at all times to the pressure and the temperature of said discharge liquid and having a higher coefficient of expansion than said casing whereby a variation in either the pressure or the temperature of said discharge liquid will cause a variation in the cross-sectional area of said passageway, and means for initially adjusting both the effective length and cross-sectional area of said passageway.

8. The combination, with a hydraulic motor which is operated by motive liquid supplied thereto in adequate volume and at a constant pressure and which carries varying loads requiring it to consume varying amounts of the energy supplied to it by said motive liquid, of means for maintaining the speed of said motor constant under all conditions of normal operation, comprising a valve casing having a tapered bore and an inlet arranged at one end of said bore and connected to said motor to receive the liquid discharged therefrom and an outlet arranged at the other end of said bore for exhausting said liquid, a valve arranged in said bore and forming therewith a restricted passageway between said inlet and said outlet, a spring for urging said valve toward said inlet to thereby increase the cross-sectional area of said passageway, said valve being urged toward said outlet by said discharge liquid and subjected at all times to the pressure and the temperature of said discharge liquid and having a higher coefficient of expansion than said casing whereby a variation in either the pressure or the temperature of said discharge liquid will cause a variation in the cross-sectional area of said passageway, and means for initially adjusting both the effective length and cross-sectional area of said passageway.

WALTER FERRIS.